July 23, 1935.  T. J. LITTLE  2,009,090
CABLE CONDUCTOR COUPLING
Filed Jan. 21, 1931    2 Sheets-Sheet 2
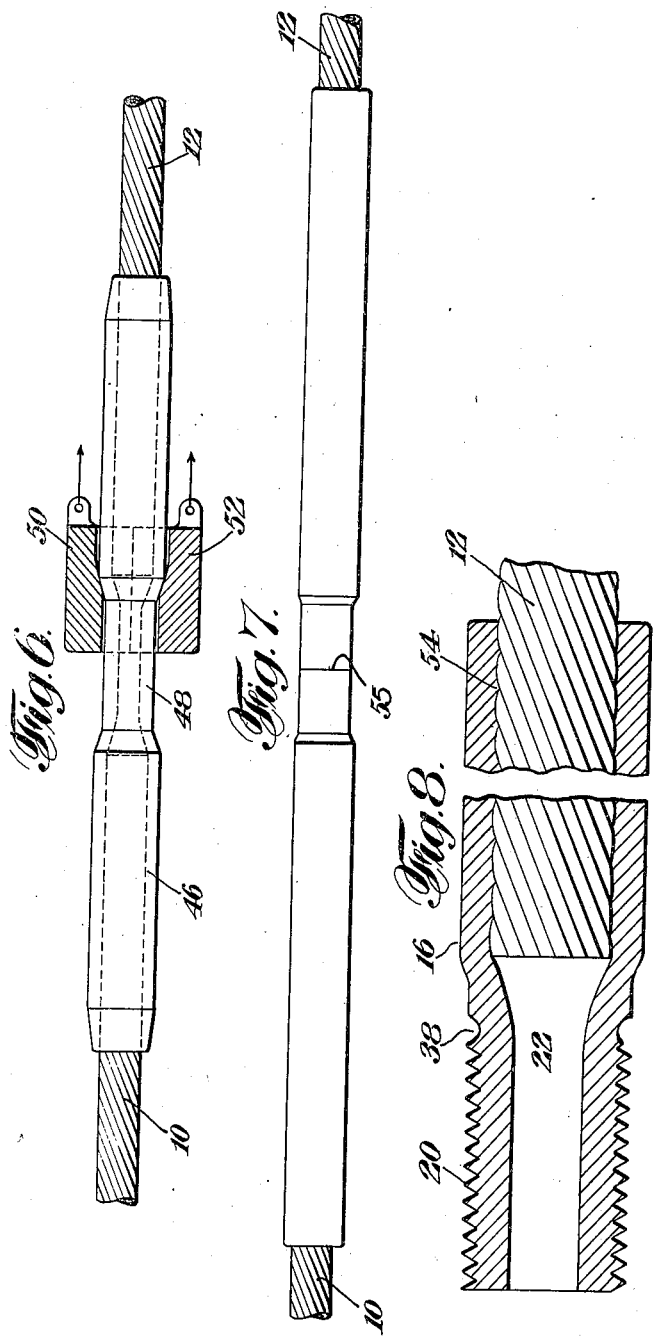
INVENTOR
Thomas J. Little
BY his ATTORNEYS
Usina & Rauber Patented July 23, 1935

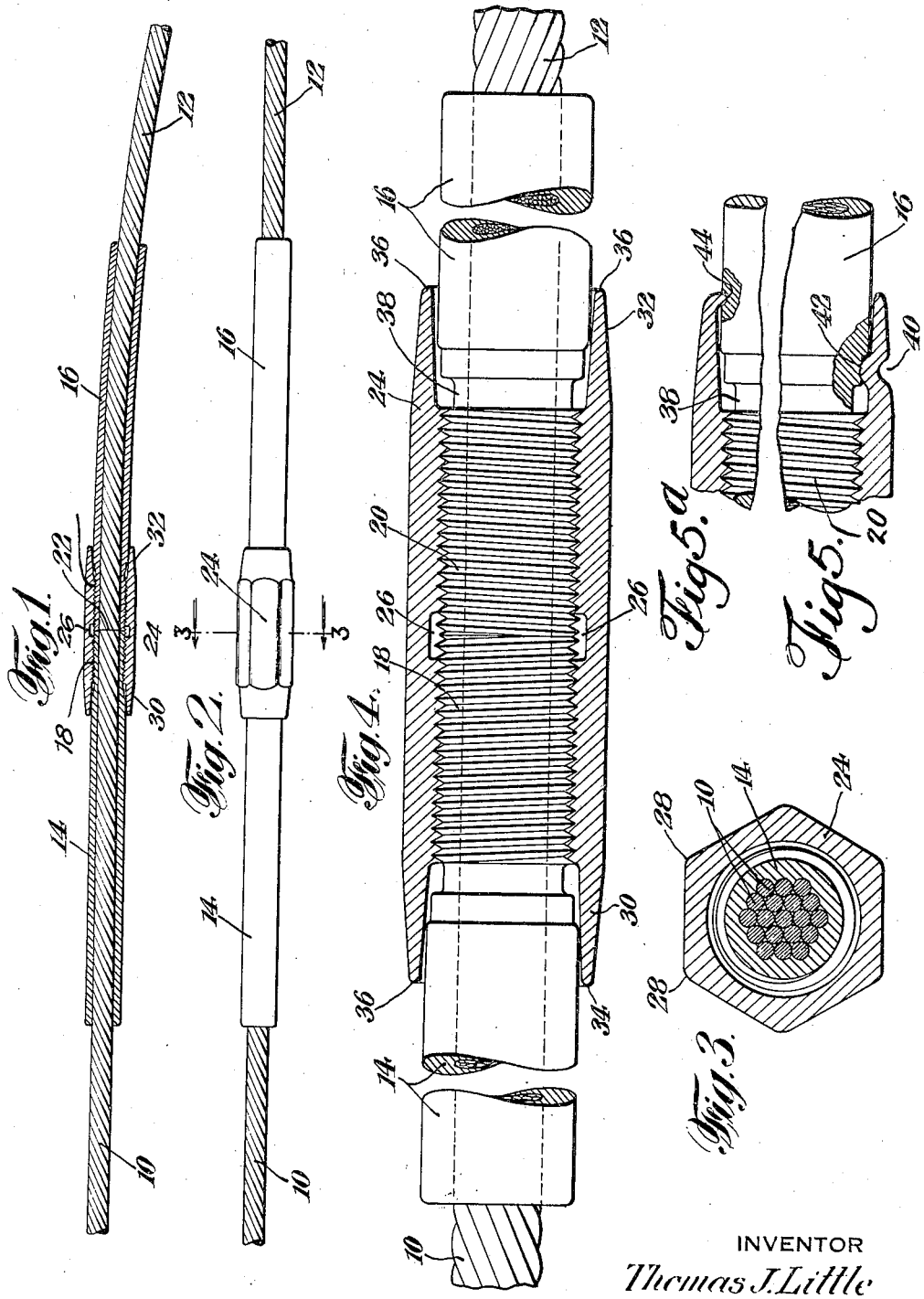

2,009,090

UNITED STATES PATENT OFFICE 2,009,090

CABLE CONDUCTOR COUPLING

Thomas J. Little, Brooklyn, N. Y., assignor to Anaconda Wire & Cable Company, New York, N. Y., a corporation of Delaware Application January 21, 1931, Serial No. 510,150

3 Claims. (Cl. 173—263)

This invention relates to improvements in design and construction for cable couplings particularly adapted for use in connection with cables transmitting electric current. The invention will be fully apparent from the following specification when read in connection with the accompanying drawings and the features of novelty will be defined with particularity in the appended claims.

In the drawings:—

Fig. 1 is a longitudinal section showing the abutting ends of two cables electrically connected by a coupling embodying my invention;

Fig. 2 is a plan view thereof;

Fig. 3 is an enlarged transverse section on line 3—3 of Fig. 2;

Fig. 4 is an enlarged view partly in longitudinal section and partly in elevation illustrating certain features of the invention;

Fig. 5 is a fragmentary view illustrating a more detailed feature of the invention;

Fig. 5a is a similar view showing a modification.

Fig. 6 is a view illustrating the manner of securing an intimate contact between the coupling conductor terminal with the stranded table.

Fig. 7 is a view illustrating a step in the method of securing the terminal to a cable end;

Fig. 8 is an enlarged longitudinal section illustrating the interlocking engagement of the conductor terminal with the stranded table;

Referring in detail to the drawings, 10 and 12 indicate adjacent ends of separate stranded cables to be joined or coupled together. The cable 10 carries a terminal indicated as a whole at 14. The cable 12 carries a somewhat similar terminal 16. The terminals 14 and 16 are provided at their extremities with external threads 18 and 20 respectively, these threads being of opposite hand. For example, the threads 18 are right handed and the threads 20 are left handed.

The ends of the cables 10 nd 12 may terminate flush with the ends of the terminals 14 and 16. In which case the cable strands will abut one another along the transverse line as indicated at 22 in Fig. 1. In some cases, however, as indicated in Fig. 8, the end of the cable may terminate a short distance from the extremity of the terminal.

The terminals 14 and 16 are connected with one another by a connection sleeve 24, the interior of which is threaded to match the right and left hand threads 18 and 20 of the terminals. Between the opposite handed threads of the sleeve, there is an unthreaded chambered portion 26 the diameter of which is slightly greater than the root diameter of the threads. This unthreaded chamber permits the terminals to be screwed up tightly so as to secure a good butt joint which gives an effective electrical contact throughout the entire abutting area of the terminals as well as the cable ends. The longitudinal length of the chamber 26 is sufficient to compensate for any error in engaging the parts during assembly. This gives a sufficient tolerance or leeway of one or two threads so as to prevent jamming of the internal threads of the coupling in the event that at the time of assembly the coupling is not caused to engage the threads of the two terminals at exactly the same time. The unthreaded chamber 26 also provides a space which will accommodate any upset fin or burr on the extremities of the terminal occasioned by a tight screwing of the parts together.

To facilitate screwing the connection sleeve 24 on the ends of the terminal the sleeve is preferably formed with a polygonal portion. For example, as illustrated in Fig. 3 it may be of substantially hexagonal shape in cross section. However, in order to prevent concentration of electrical discharge, the flat surfaces of the hexagonal part are joined by rounded or curved portions, as indicated at 28. Such rounding or curving is of importance in a device of this character which is frequently used for the transmission of high voltage alternating currents.

At its opposite extremities, the connection sleeve 24 is provided with unthreaded extensions 30 and 32. The extreme edges of these extensions 30 and 32. The extreme edges of these extensions, as indicated at 34 and 36 are rounded in order to prevent the concentration of corona or other electrical discharge or disturbances which might result in power losses and also cause radio interference.

The unthreaded extensions 30 and 32 are also adapted to form outboard bearing surfaces to relieve the terminals of bending strains. In a threaded terminal of the character shown there is usually a neck or fillet 38 of a diameter substantially equal to that of the root of the threads. The reduced section area at this neck or fillet portion tends to weaken the resistance of the terminal to bending strains. To overcome this weakness and to relieve the terminal of bending strains, I provide the unthreaded extension above described. With such an extension, when the cable sags or is bent or flexed from a true horizontal line, the terminal will make contact with the inner bore of the unthreaded extension, for example, as indicated at the right in Fig. 1 where the cable is represented as having been bent downwardly so as to bring the terminal into engagement with the inner bore of the extension 32.

After the terminals have been screwed up tightly and secured in abutting relationship by the connector sleeve 24 they may be impositively locked by swaging the portion of the extension sleeve into interlocking engagement with the adjacent terminal. For example, as illustrated in Fig. 5, the extension portion 32 may be struck with a blunt instrument such as a ball-peen hammer or by a heavy drift-pin. In this way, the protrusion 40 may be forced inwardly from the extension so as to interengage with a depression 42 in the terminal caused by the blow. Or alternatively, as indicated at 44 in Fig. 5a, the outer extremity of the extension of the connector sleeve may be peened over into interlocking relationship with an indentation thus formed in the adjacent terminal.

In order to obtain a good electrical as well as mechanical bond between the end of the stranded cable of the terminal, I preferably draw or swage the metal of the terminal into interlocking relationship with the interstices between the adjacent strands of the stranded conductor. This may be accomplished in the manner illustrated in Figs. 6 to 8 inclusive. As shown in these figures, the ends of the cables 10 and 12 are inserted in the bores of the tube-like member 46 of which the terminals are formed. This tube is of reduced diameter at an intermediate point as indicated at 48. In order to draw the metal and force it into interlocking engagement with the strands of the cable, I employ a split die including complementary members 50 and 52. These are suitably held in a known type of apparatus forming part of the draw bench.

Whereupon a force is exerted in the direction of the arrows so as to cause a flowing of the metal so that portions thereof for example as indicated at 54 in Fig. 8, interlock with the strands of the conductor and thus bond the cable both electrically and mechanically. Fig. 7 illustrates a step of such a drawing operation in which it is noted that there is a considerable elongation of the metal. This being indicated by a comparison of the metal stock shown in Figs. 6 and 7. It will be understood of course that in the illustration of Fig. 6 the metal is first drawn or swaged into engagement with the cable 12. Then the dies 50 and 52 are reversed whereupon the metal is drawn on the cable 10. After the drawing operation, the joint is severed along the line 55, as indicated in Fig. 7. The exterior of the terminal is then threaded, the latter then appearing as shown in Fig. 8. Or instead of having a reduced bore at the end of the terminal, as indicated in Fig. 8 it will be understood that the bore of the terminal may be of substantially the same diameter as that of the conductor cable as in Figs. 1 and 4.

With the connection illustrated, the conductivity of the joint or connection is at least equal to and preferably greater than that of the normal section of the cable. The parts are usually made of copper or bronze and the structure is such that there are two electrical paths, one directly between the terminals and the other through the connecting sleeve 24. This insures a copper section of lower electrical and thermal resistance than that of an equal length of the conductors joined.

While I have described the specific details of the various embodiments of the invention illustrated with great particularity it is not to be construed that I am limited thereto since various modifications and substitution of equivalents may be made by those skilled in the art without departing from the invention as defined in the appended claims.

What I claim is:—

1. A conductor coupling of the character described comprising a pair of abutting sleeve-like terminals with respective right and left hand exterior threads, conductors having free ends which terminate flush with the ends of said terminals, a threaded connection sleeve fitted to said terminals and exerting a pressure to hold the terminals and the conductors in electrical contact.

2. A conductor coupling of the character described comprising a pair of abutting sleeve-like terminals with respective right and left hand exterior threads, conductors having free ends which terminate flush with the ends of said terminals, a threaded connection sleeve fitted to said terminals and exerting a pressure to hold the terminals and the conductors in electrical contact, said conducting sleeve having at its opposite ends unthreaded extensions embracing portions of said terminals beyond the threaded extremities thereof and adapted to relieve the threaded portions of the terminals from strains as the conductors and terminals are flexed when in use.

3. A conductor coupling of the character described comprising a pair of abutting sleeve-like terminals with respective right and left hand exterior threads, conductors having free ends which terminate flush with the ends of said terminals, a threaded connection sleeve fitted to said terminals and exerting a pressure to hold the terminals of the conductors in electrical contact, said connection sleeve having an unthreaded chamber in a zone surrounding the plane of abutment of said terminals and conductors.

THOMAS J. LITTLE.